United States Patent
Butt

(10) Patent No.: US 6,243,752 B1
(45) Date of Patent: Jun. 5, 2001

(54) TRANSMITTING DATA BETWEEN A HOST COMPUTER AND A TERMINAL COMPUTER

(75) Inventor: John Butt, Ipswich (GB)

(73) Assignee: British Telecommunications plc, London (GB)

(*) Notice: Subject to any disclaimer, the term of this patent is extended or adjusted under 35 U.S.C. 154(b) by 0 days.

(21) Appl. No.: 09/043,153

(22) Filed: Mar. 13, 1998

(30) Foreign Application Priority Data

Sep. 13, 1995 (EP) .................................................. 95306427

(51) Int. Cl.⁷ ...................................................... G06F 15/16
(52) U.S. Cl. .......................... 709/227; 709/217; 709/227; 340/825.01; 370/431
(58) Field of Search .................................... 709/217, 227, 709/229, 228; 340/825.01; 370/431

(56) References Cited

U.S. PATENT DOCUMENTS

| | | |
|---|---|---|
| 5,241,686 * | 8/1993 | Charbonnier . |
| 5,325,361 * | 6/1994 | Lederer et al. . |
| 5,347,632 * | 9/1994 | Filepp et al. . |
| 5,598,570 * | 1/1997 | Ho et al. . |
| 5,675,507 * | 10/1997 | Bobo, II ........................... 364/514 |
| 5,742,668 * | 4/1998 | Pepe et al. . |
| 5,784,683 * | 7/1998 | Sistanizadeh et al. . |
| 5,805,997 * | 9/1998 | Farris . |
| 5,956,651 * | 9/1999 | Willkie et al. . |
| 6,028,848 * | 2/2000 | Bhatia et al. . |
| 6,029,203 * | 2/2000 | Bhatia et al. . |
| 6,064,666 * | 5/2000 | Willner et al. . |

FOREIGN PATENT DOCUMENTS

WO 94/13086 * 6/1994 (WO) ............................ H04L/29/06

* cited by examiner

*Primary Examiner*—Robert B. Harrell
*Assistant Examiner*—Stephan Willett
(74) *Attorney, Agent, or Firm*—Nixon & Vanderhye P.C.

(57) ABSTRACT

A terminal computer is used to send instructions to a host computer through a public network to open and close application programs and to transmit data between the application programs and the terminal computer through the public network. In order to open application programs, the terminal computer establishes an initial connection between the two computers and instructions are sent over this initial connection to open application programs. The host computer establishes an additional connection for each application program. In the terminal computer, a respective terminal emulator window is created for each additional connection. For each application program, data is transmitted over the respective additional connection using a character-based protocol. In the terminal computer, the data is converted from the character-based format to a bit-mapped graphical format and then displayed in the respective terminal emulator window.

8 Claims, 6 Drawing Sheets

TRANSMITTING DATA BETWEEN A HOST COMPUTER AND A TERMINAL COMPUTER

BACKGROUND OF THE INVENTION

1. Field of the Invention

This invention relates to a method of transmitting data through a communications network between a host computer and a terminal computer.

2. Related Art

There is a requirement to transmit data from a plurality of application programs running on a host computer through a communications network to a terminal computer operating in a windowing environment. This requirement could be met by causing the terminal computer to log on to the host computer for each application program in turn. However, the solution adds to the workload of the user of the terminal computer and would require a user code for each application program. Another solution would be to connect the host and terminal computers in a common network-based windowing environment using a commercially available network-based window management system such as X Windows. However, this solution suffers from the disadvantage that a windowing environment connection between two computers requires a relatively high bandwidth which can be costly.

In WO 94/13086, there is described a system for multiplexing data transmissions between a host computer and a user workstation connected by a communications link. In this system, one or more program sessions can be transmitted between ther host computer and the user workstation through a single connection.

SUMMARY OF THE INVENTION

According to one aspect of this invention, there is provided a method of transmitting data between a host computer and a computer acting as a terminal computer through a communications network, said data relating to a plurality of application programs running on the host computer, said terminal computer operating in a windowing environment, said method comprising the steps of:

said terminal computer establishing an initial connection between the terminal computer and the host computer;

said terminal computer creating an initial terminal emulator window for said initial connection;

said host computer transmitting a menu of its application programs to the terminal computer over said initial connection using a character-based protocol;

said terminal computer displaying said menu in said initial terminal emulator window; and for each application program selected by the user of the terminal computer:

transmitting a request over said initial connection from the terminal computer to the host computer to open the selected application program;

said host computer establishing an additional connection between the host computer and the terminal computer;

said terminal computer creating an additional terminal emulator window for said additional connection;

transmitting data relating to said selected application program between the host computer and the terminal computer over said additional connection using a character-based protocol; and displaying data relating to said selected application programs in said additional terminal emulator window.

Because the request to open each selected application program is transmitted over the initial connection, the host computer creates an additional connection for each selected application program, and the terminal computer creates an additional terminal emulator window for each selected application program, the user does not log on for each desired application program. Also, because the data for each application program is transmitted using a character-based protocol, the data is transmitted without using the high bandwidth which is required where two computers are connected in a windowing environment.

According to another aspect of this invention, there is provided a computer system comprising a host computer, a computer acting as a terminal computer and a telecommunications network for transmitting data between said computers, said terminal computer operating in a windowing environment, each of said computers being controlled by a respective program, and said programs being arranged so as to cause said computers to perform the following operations in order to transmit data relating to a plurality of application programs running on said host computer between said computers:

said terminal computer establishes an initial connection between the terminal computer and the host computer;

said terminal computer creates an initial terminal emulator window for said initial connection;

said host computer transmits a menu of its application programs to the terminal computer over said initial connection using a character-based protocol;

said terminal computer displays said menu in said initial terminal emulator window; and for each application program selected by the user of the terminal computer:

said terminal computer transmits a request over said initial connection to the host computer to open the selected application program;

said host computer establishes an additional connection between the host computer and the terminal computer;

said terminal computer creates an additional terminal emulator window for said additional connection;

data relating to said selected application program is transmitted between the host computer and the terminal computer over said additional connection using a character-based protocol; and data relating to said selected application program is displayed in said additional terminal emulator window.

BRIEF DESCRIPTION OF THE DRAWINGS

This invention will now be described in more detail, by way of example, with reference to the drawings in which.

DETAILED DESCRIPTION OF EXEMPLARY EMBODIMENTS

Figure 1:
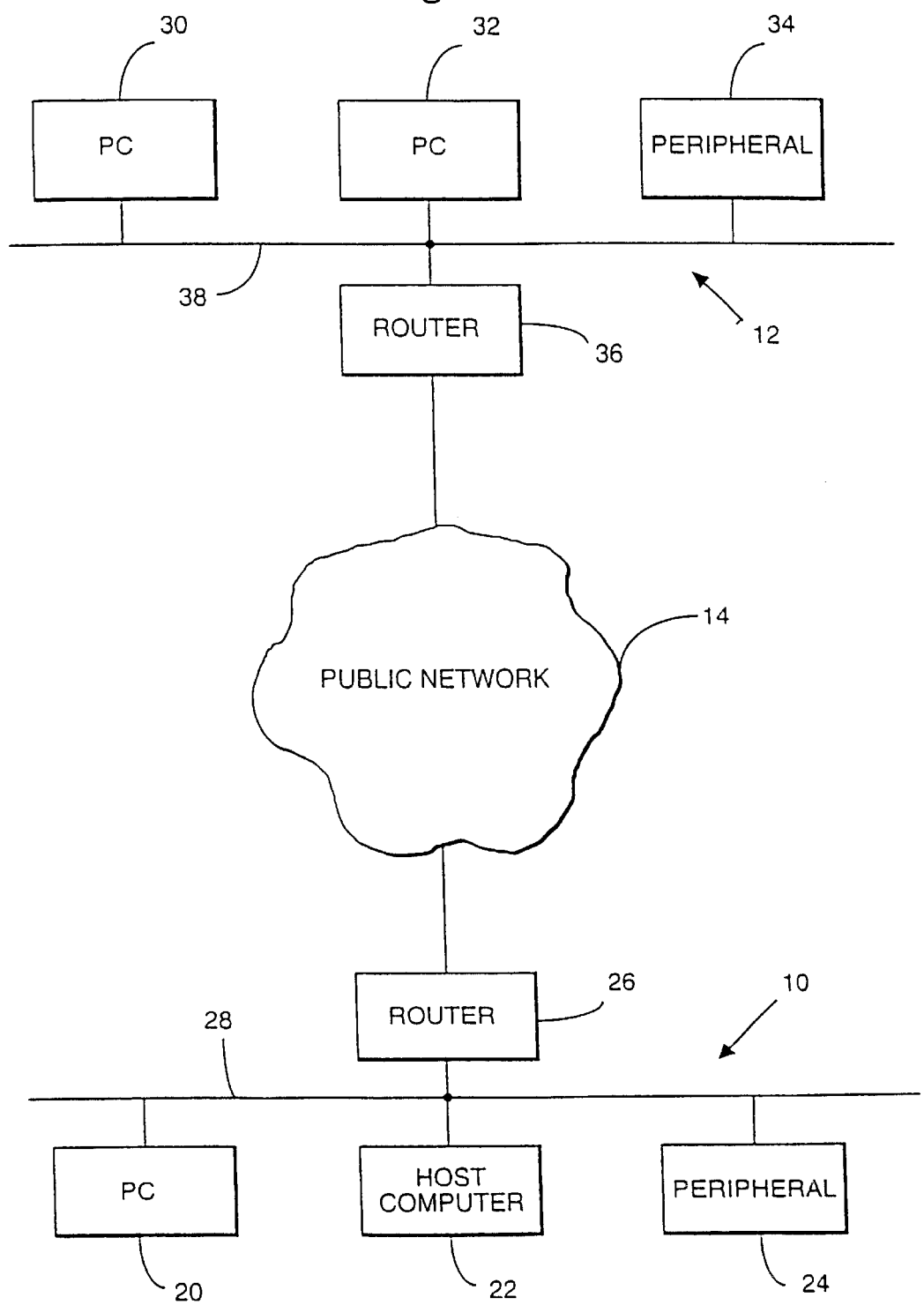
FIG. 1 is a block diagram of an arrangement comprising two local networks connected by a public network and in which the present invention may be used.

Referring now to FIG. 1, there are shown a pair of Ethernet local area networks 10 and 12 which are connected together by a public telecommunications network 14 to form a wide area network.

The local area network 10 comprises a personal computer 20, a host computer 22, a peripheral device, for example a printer 24, and a router 26 which is connected to the public network 14. The personal computer 20, the host computer 22, the peripheral device 24 and the router 26 are connected together by a common bus 28.

The local area network 12 comprises a pair of personal computers 30 and 32, a peripheral device, for example, a printer 34, and a router 36. The router 36 is connected to the public network 14. The personal computers 30 and 32, the peripheral 34 and the router 36 are connected to a common data bus 38.

The routers 26 and 36 permit data to be transmitted between the two local area networks 10 and 12. The host computer 22 differs from the personal computers 20, 30 and 32 in that its application programs may be accessed by the other computers. Thus, one of the personal computers 30 or 32 may access the application programs of the host computer 22. As will be explained in more detail below, the host computer 22 and the personal computers 30 and 32 contain control programs which enable data from a plurality of application programs on the host computer 22 to be transmitted through the public network 14 between one of the personal computers 30 and 32 and the host computer 22. When one of the personal computers 30, 32 accesses the application programs on the host computer 22, it is operating as a terminal computer. Although the present invention will be described in this example with reference to transmitting data through a public telecommunications network, it is to be appreciated that it may also be used for transmitting data through a private telecommunications network.

Figure 2:
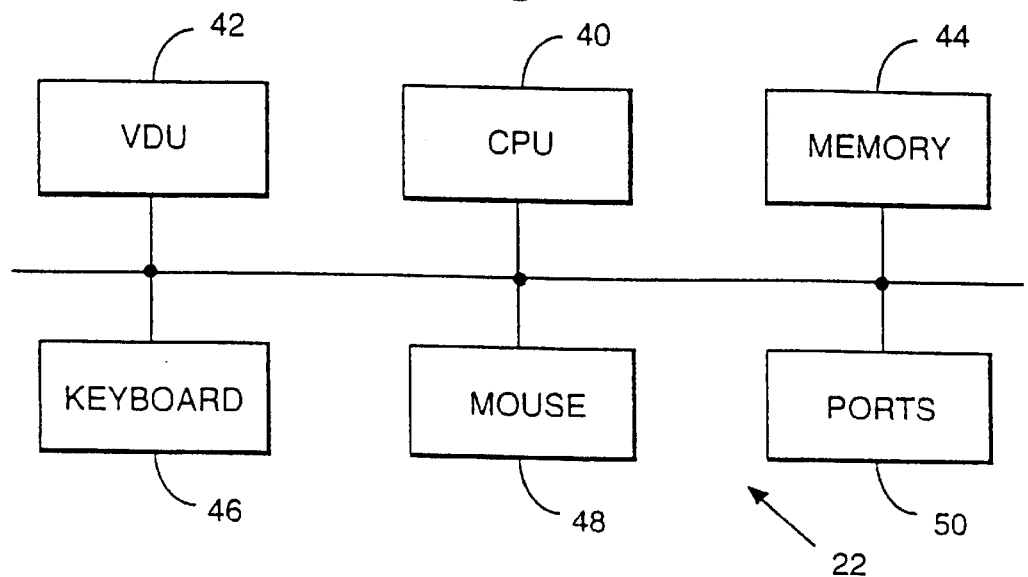
FIG. 2 is a block diagram showing the main hardware components of a computer.

The general structure of the hardware components of a computer is well known to those skilled in the art. By way of example, the main hardware components of the host computer 22 are illustrated in block form in FIG. 2. These hardware components comprise a central processing unit (CPU) 40, a visual display unit (VDU) 42, memory 44, a keyboard 46, a mouse 48 and ports 50. The ports 50 enable the computer 22 to receive data from and transmit data to the common bus 28. The memory comprises random access memory (RAM), read-only memory (ROM) and one or more hard disks for storing data. The memory 44 contains the software programs for controlling the computer 22.

Figure 3:
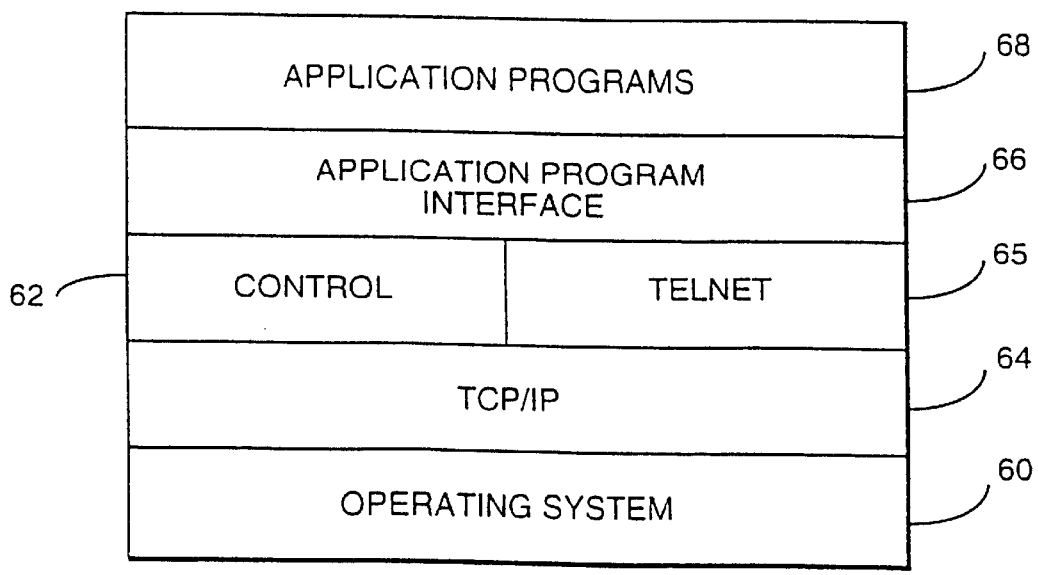
FIG. 3 is a block diagram showing the software architecture of a host computer located in one of the local networks of FIG. 1.

Referring now to FIG. 3, there is shown the software architecture of the programs provided in the host computer 22. The programs comprise an operating system 60, a control program 62 (to be described in more detail below), a pair of communications programs 64, 65, an application program interface 66 and a set of application programs 68. The application programs 68 comprise a set of commercially available application programs selected in accordance with the tasks which are required of the computer 22.

The operating system 60 is a commercially available operating system and may be, for example, the widely used Unix operating system. The application program interface 66 provides a set of common resources which may be used with the application programs 68 and enables the application programs 68 to operate in a windowing environment. In a windowing environment, the output from each application program or file is converted into a bit-map format and displayed in an individual window. The application program interface 66 may take the form of the commercially available X Windows application program interface.

The two communications programs 64 and 65 enable the computer 22 to transmit data to and receive data from other computers. In more detail, the communications program 64 enables the data to be routed to and from other computers according to the TCP/IP protocol. The communications program 65 enables alpha-numeric data to be transmitted to and received from other computers according to the character-based protocol known as the TELNET protocol. Suitable software packages for the programs 64 and 65 are commercially available.

The control program 62 enables the host computer 22 to transmit data from its application programs to other computers through a telecommunications network in accordance with the method of this invention as will be described in detail below.

The software architecture of each of the personal computers 30 and 32 is generally similar to that of the host computer 22 but with differences in detail. The software architecture of the programs provided in one of the computers 30 and 32 is shown in FIG. 4 and will now be described.

Figure 4:
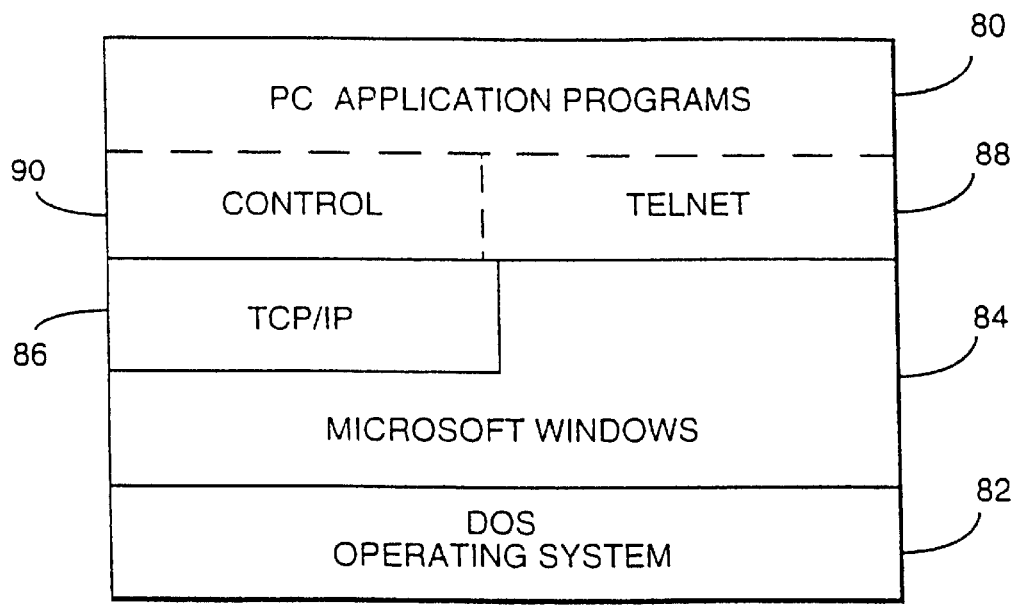
FIG. 4 is a block diagram showing the software architecture of a terminal computer located in the other local network of FIG. 1.

Referring now to FIG. 4, the programs include a set of application programs 80, the choice of which will depend upon the tasks which the computer is required to perform. The programs also include an operating system 82 and an application program interface 84, which in the present example are, respectively, the widely used MS-DOS operating system and the Microsoft Windows application program interface. Thus, each of the computers 30 and 32 will operate in a windowing environment.

The programs also include a pair of communication programs 86 and 88 which are generally similar to the communication programs 64 and 65. However, the program 88 contains a terminal emulator process which serves the function of making the personal computer appear to the host computer as a standard terminal.

Lastly, the programs include a control program which enables the computer to receive connection requests from the host computer and also to receive data from, and transport data to, the application programs of the host computer through the public network 14 in accordance with the method of this invention as will be described below.

Figure 5:
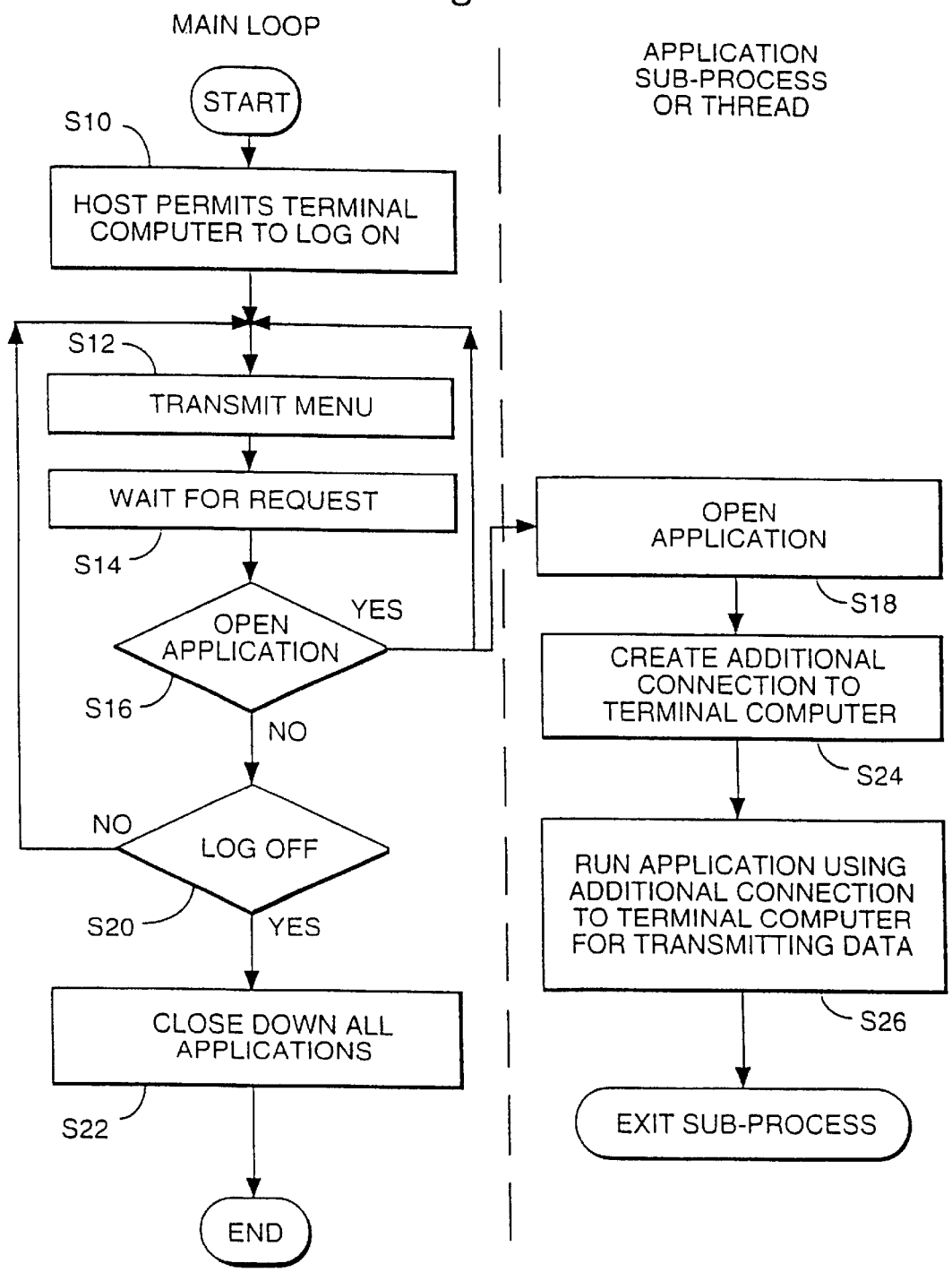
FIG. 5 is a flowchart of a control program forming part of the software of the host computer.
Figure 6:
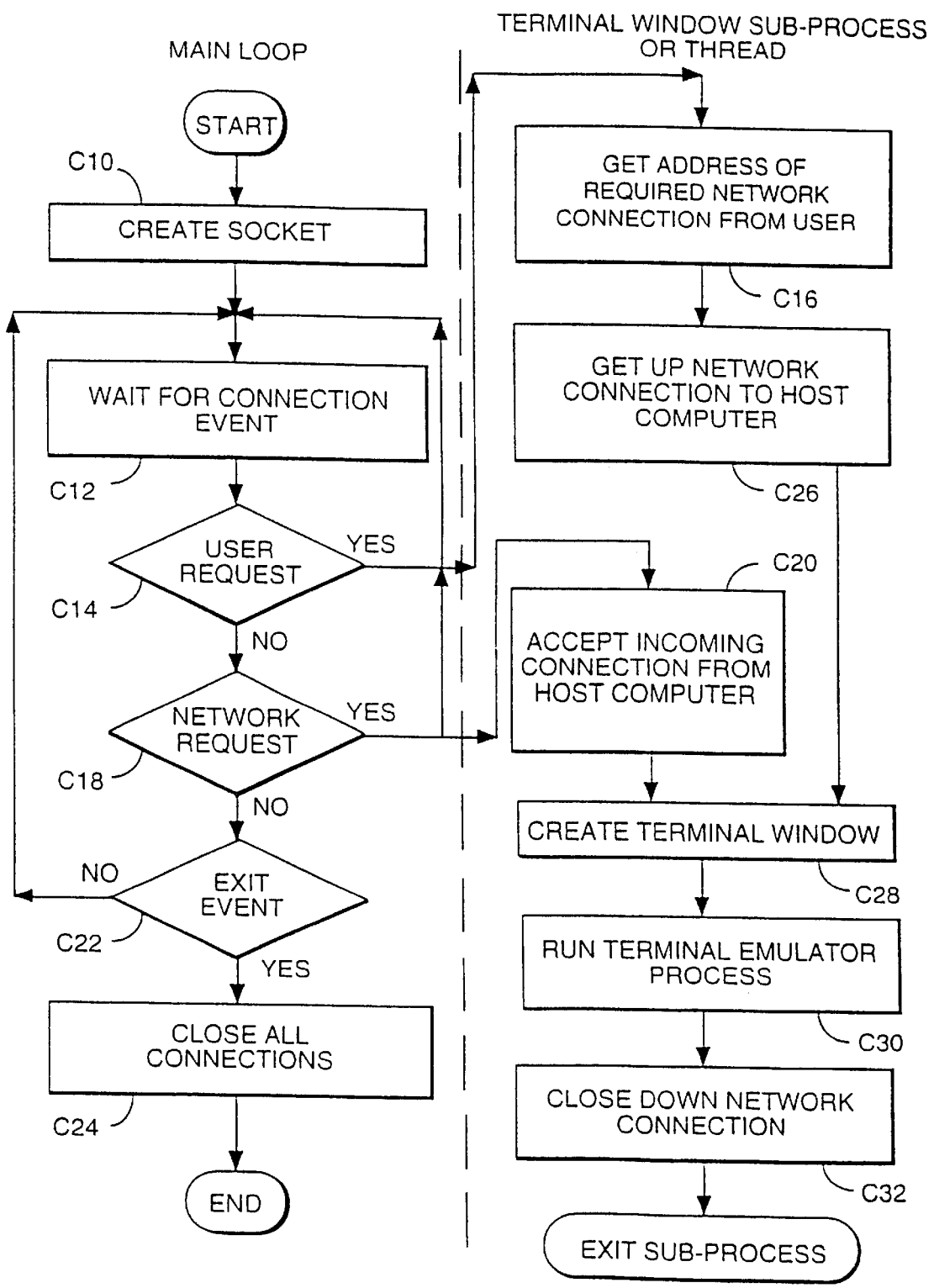
FIG. 6 is a flowchart of a control program forming part of the software of the terminal computer.

A flow chart for the control program 62 used in the host computer 22 is shown in FIG. 5 and a flow chart for the control program 90 used in the personal computers 30 and 32 is shown in FIG. 6. The two control programs 62 and 90 cooperate with each other to permit the computer 30 or 32 to access simultaneously a plurality of application programs contained in the host computer 22. When one of the personal computers 30 and 32 is used in this manner, it is acting as a terminal computer and will be so described in the subsequent discussion. These two flow charts will now be described.

Each of the control programs 62 and 90 comprises a main loop, shown on the left-hand side of the respective flow chart. The control program 62 also has an application sub-process or thread shown on the right-hand side of FIG. 5. On each occasion that a user of the terminal computer wishes to access an application program in the host computer, the control program 62 creates and enters an application sub-process or thread. The control program 90 also has a terminal window sub-process, shown on the right-hand side of FIG. 6. As will be explained below, for each connection between the host computer and the terminal computer, a terminal window is created in the terminal computer. A terminal window sub-process is created and entered for each connection.

When the user of the terminal computer wishes to access applications in a host computer, in a step C10, the control program in the terminal computer creates a socket to listen for connection events. In a step C12, it then waits for connection events. A connection event may be a request from the user to set up a connection to a particular host computer, a request from a host computer to accept a new connection, or a request from a host computer to close all connections.

When the control program in the terminal computer receives a connection event, it proceeds to step C14 in which it checks if the connection event is a request to set up an initial connection to a host computer. If it is such a request, it creates a terminal window sub-process and enters the sub-process in a step C16. In the main loop, it returns to step C12.

If it is not a request to set up an initial connection to a host computer, it proceeds to step C18. In step C18, it checks if the connection event is a request to accept a new connection from a host computer. If it is such a request, it creates a terminal window sub-process and enters the sub-process in a step C20. In the main loop, it returns to step C12.

If it is not a request to accept a new connection from a host computer, it proceeds to step C22. In step C22, it checks if the connection event is a request to close all connections. If it is such a request, it proceeds to step C24. If it is not such a request, it returns to step C12. Steps C20 and C24 will be described later.

In step C16, the control program in the terminal computer obtains the network address of the desired host computer from the user of the terminal computer. Then, in a step C26, it sets up an initial connection to the host computer using the TELNET protocol.

Then, in a step C28, it creates a terminal emulator window for the initial connection and, in a step C30, it creates and runs a terminal emulator process. The terminal emulator process permits the terminal computer to receive alphanumeric data from, and transmit data to, the host computer over the initial connection using the TELNET protocol. The terminal emulator process makes the terminal computer appear to the host computer as a terminal.

When the host computer receives a request from a terminal computer to accept an initial connection, it enters the main loop of its control program and proceeds to step S10. In step S10, it causes its operating system together with the TCP/IP and TELNET programs to allow the terminal computer to log on to the host computer, thereby establishing the initial connection between the two computers.

When log on is complete, the control program in the host computer proceeds to step S12. In step S12, it transmits a menu of its application programs to the terminal computer over the initial connection and at the same time obtains the network address of the terminal computer for use later in step S24.

The menu is displayed in the terminal emulator window of the terminal computer which is associated with the initial connection. The menu invites the user of the terminal computer to request the host computer either to open an application program selected by the user or to request the host computer to log off. When the user decides to open a selected application program or to log off, he enters his decision at the terminal computer. The result of his decision is then transmitted as a request over the initial connection to the host computer.

In the host computer, after performing step S12, it proceeds to step S14. In step S14, the host computer awaits a request from the terminal computer. When it receives a request, it proceeds to step S16.

In step S16, it checks if the request is a request to open an application program. If it is a request to open an application program, it creates an application sub-process and enters the sub-process in step S18. In the main control loop, it returns to step S12 and redisplays the menu. (In the terminal computer, the menu is redisplayed in the terminal emulator window associated with the initial connection.)

If the request is not a request to open an application program, it continues with step S20. In step S20, it checks if the request is a request to log off. If it is not a request to log off, it returns to step S12. If it is a request to log off, it proceeds with step S22. Step S22 will be described below.

In the application sub-process in the host computer, in step S18, it opens the application program selected by the user. Then, in a step S24, using the TCP/IP and TELNET programs, it creates an additional connection to the terminal computer. Then, in a step S26, it runs the selected application program and uses the newly-created additional connection for transmission of data relating to the application program between the host and terminal computers. The data is transmitted according to the character-based TELNET protocol.

As mentioned above, when the terminal computer receives a request to create an additional connection, it creates a new terminal window sub-process, and enters the sub-process at step C20. In step C20, it uses its TCP/IP and TELNET programs to accept the incoming additional connection from the host computer.

Then, in a step C28, it creates an additional terminal emulator window for the additional connection. In a step C30, it runs the terminal emulator process for the additional connection. As a result of doing this, data from the newly-opened application program in the host computer is displayed in the additional terminal emulator window. In the terminal computer, the data received on the additional connection is converted from the character-based TELNET protocol format into a bit-mapped format prior to display.

When several application programs have been opened, the data for each application program will be transmitted over a respective additional connection and displayed in the terminal computer, in a respective terminal emulator window. Data relating to the menu will be transmitted over the initial connection.

When the user of the terminal computer closes an application, the respective sub-process in the terminal computer proceeds to step C32 in which it closes down the connection associated with the closed application. It then exits the sub-process. The host computer also exits the respective sub-process. Any other connections, including the initial connection, remain open.

When the user of the terminal computer enters a decision to log off, the terminal computer sends a corresponding request to the host computer. In the host computer, the main control loop goes to step S22 in which it closes down all applications.

In step S22, it also transmits a request over the initial connection to the terminal computer to close all connections. In the terminal computer, the main control loop goes to step C24 in which it closes all connections.

Because the data is transmitted in accordance with a character-based protocol, the transmission is achieved without using a high bandwidth. However, because the data is converted to a bit-mapped graphical format in the terminal computer, the data is displayed in the terminal computer in a bit-mapped windowing environment. Thus, this method combines the advantage of low bandwidth transmission associated with a character-based transmission protocol with the general advantages of displaying data in a windowing environment. Also, because an additional connection is created automatically for each application program for transmitting data between the host computer and the terminal computer, the user does not have the inconvenience of having to log on for each application program. Because of the high cost of transmitting data using a high bandwidth in a wide area network, this invention is of particular use in a wide area network. However, it is also useful in a local area network as it reduces bandwidth requirements.

Figure 7:
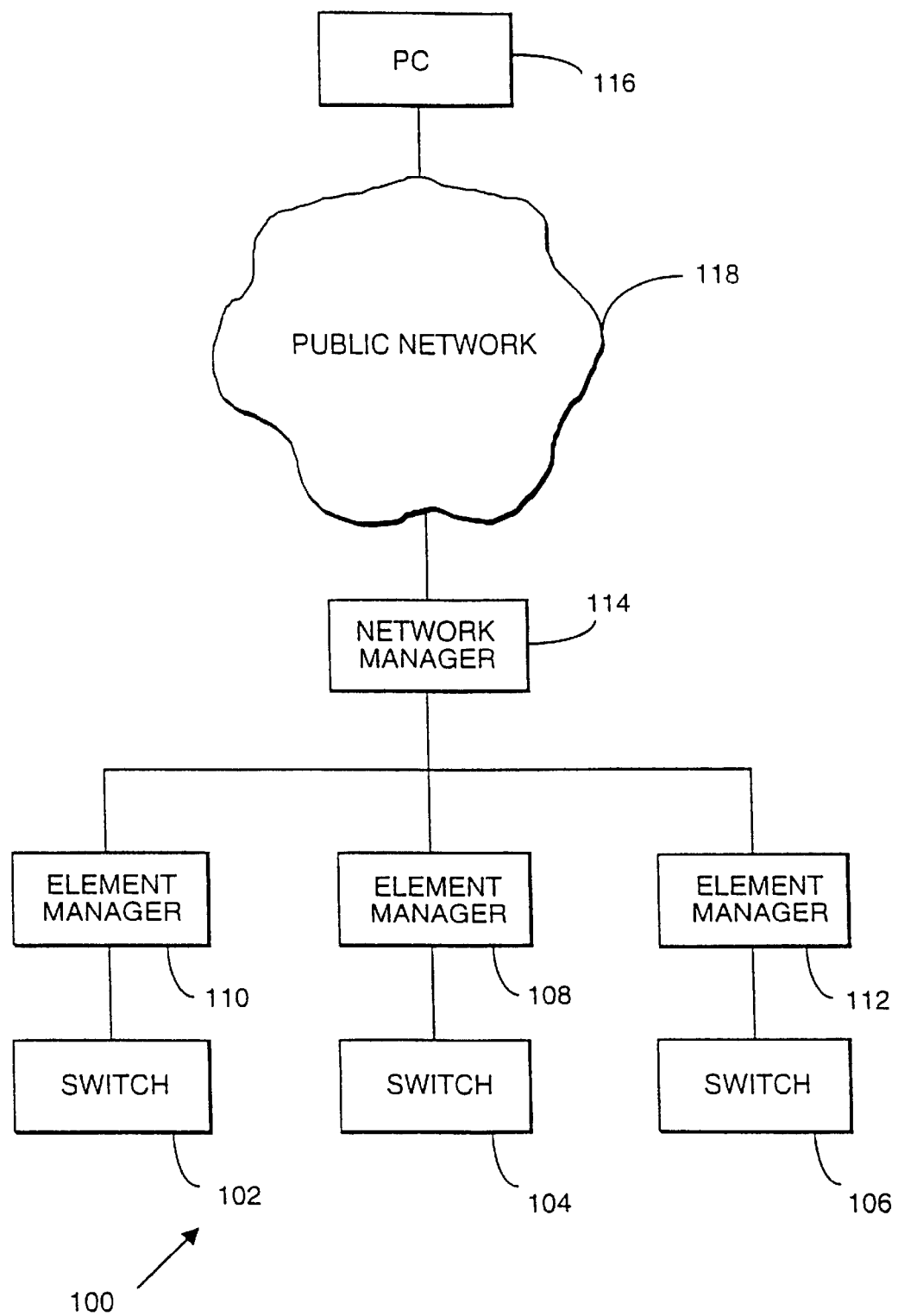
FIG. 7 is a block diagram showing some of the components of a network management system in which the present invention may be used.

Referring now to FIG. 7, there is shown a network management system 100 in which there may be used the method described above for transmitting data between a host computer and a terminal computer.

The network management system comprises three switches 102, 104 and 106 which form part of a telecommunications network. The switches 102, 104 and 106 are managed, respectively, by three element managers 108, 110 and 112. The element managers 108, 110 and 112 are managed by a network manager 114.

As is well known to those skilled in the art, element managers and network managers are implemented as computers which contain appropriate application programs. The application programs of the network manager 114 include programs for sending instructions to the element managers to configure the switches which they manage, for example, to modify services to existing customers, and programs for receiving fault and performance data from the element managers.

It may be required to operate the network manager 114 from a personal computer, acting as a terminal, and which is located remotely from the network manager 114. FIG. 7 shows a personal computer 116 which is located remotely from the network manager 114 and which may be connected to it through a public telecommunications network 118. The personal computer 116 has a software architecture which is generally similar to the architecture described with reference to personal computers 30 and 32 and the network manager 114 has a software architecture generally similar to that described with reference to host computer 22 and shown in FIG. 3. Thus, the personal computer 116 has a control program similar to the control program described with reference to FIG. 6 and the network manager 114 has a control program which is similar to that described with reference to FIG. 5. Consequently, the user of the personal computer 116 can open application programs on the network 114 and the data generated by these application programs can be transmitted to the personal computer 116 through the public network 118.

What is claimed is:

1. A method of establishing data connections between a host computer and a computer acting as a terminal computer through a communications network, said data connections relating to a plurality of application programs running on the host computer, said method comprising the steps of:

said terminal computer establishing an initial connection between the terminal computer and the host computer using a long-on procedure;

said terminal computer creating an initial terminal emulator window for said initial connection;

said host computer transmitting a menu of its application programs to the terminal computer over said initial connection;

said terminal computer displaying said menu in said initial terminal emulator window; and for each application program selected by the user of the terminal computer:

transmitting a request over said initial connection from the terminal computer to the host computer to open the selected application program;

said host computer establishing an additional connection between the host computer and the terminal computer;

said terminal computer creating an additional terminal emulator window for said additional connection;

transmitting data relating to said selected application program between the host computer and the terminal computer over said additional connection; and displaying data relating to said selected application programs in said additional terminal emulator window.

2. A method as in claim 1 in which, after said step of establishing an initial connection between the terminal computer and the host computer, the host computer obtains the network address of the terminal computer, and said host computer uses said network address during said step of establishing an additional connection between the host computer and the terminal computer.

3. A method as in claim 1 in which, in the terminal computer, the data relating to each application program is converted from character-based protocol into a bit-mapped format prior to display in the respective additional terminal emulator window.

4. A method as in claim 1 in which the host computer is a network manager.

5. A computer system comprising a host computer, a computer acting as a terminal computer and a network for transmitting data between said computers, each of said computers being controlled by a respective program, and said programs being arranged so as to cause said computers to perform the following operations in order to transmit data connections between a plurality of application programs running on said host computer and said terminal computers:

said terminal computer establishes an initial connection between the terminal computer and the host computer using a log-on procedure;

said terminal computer creates an initial terminal emulation window for said initial connection;

said host computer transmits a menu of its application programs to the terminal computer over said initial connection;

said terminal computer displays said menu in said initial terminal emulator window; and for each application program selected by the user of the terminal computer:

said terminal computer transmits a request over said initial connection to the host computer to open the selected application program;

said host computer establishes an additional connection between the host computer and the terminal computer;

said terminal computer creates an additional terminal emulator window for said additional connection;

data relating to said selected application program is transmitted between the host computer and the terminal computer over said additional connection; and data relating to said selected application program is displayed in said additional terminal emulator window.

6. A computer system as in claim 5 in which, after the initial connection between the terminal computer and the host computer has been established, the host computer obtains the network address of the terminal computer and uses said network address when establishing an additional connection between the host computer and the terminal computer.

7. A computer system as in claim 5 in which, in the terminal computer the data relating to each application program is converted from character-based protocol into a bit-mapped format prior to display in the respective additional terminal emulator window.

8. A computer system as in claim 5, in which the host computer is a network manager.

* * * * *